United States Patent
Mejia Perez et al.

(10) Patent No.: US 10,112,543 B1
(45) Date of Patent: Oct. 30, 2018

(54) LOAD FLOOR LATCHES AND LATCH ASSEMBLIES, AND VEHICLES HAVING THE SAME

(71) Applicant: GM GLOBAL TECHNOLOGY OPERATIONS LLC, Detroit, MI (US)

(72) Inventors: Gustavo Mejia Perez, Metepec (MX); Williams Reynaldo Celis Torres, Metepec (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 58 days.

(21) Appl. No.: 15/480,734

(22) Filed: Apr. 6, 2017

(51) Int. Cl.
  *B60R 11/06* (2006.01)
  *B60R 5/04* (2006.01)
  *F16B 21/02* (2006.01)

(52) U.S. Cl.
  CPC ............. *B60R 5/04* (2013.01); *F16B 21/02* (2013.01)

(58) Field of Classification Search
  CPC .................................. B60R 5/04; F16B 21/02
  See application file for complete search history.

(56) References Cited

U.S. PATENT DOCUMENTS

| 6,848,226 | B1 * | 2/2005 | Boyd | E04F 19/08 16/225 |
| 2009/0039679 | A1 * | 2/2009 | Karagitz | B60R 5/04 296/193.07 |
| 2018/0016817 | A1 * | 1/2018 | Ayala Diaz | E05B 85/10 |
| 2018/0099616 | A1 * | 4/2018 | Wright | B60R 5/044 |

* cited by examiner

*Primary Examiner* — Lori L Lyjak
(74) *Attorney, Agent, or Firm* — Lorenz & Kopf, LLP

(57) ABSTRACT

Vehicles, load floor latch assemblies, and latches are provided for selectively securing and accessing a compartment in a vehicle. The load floor latch assembly includes a load floor having an upper surface and a lower surface. The load floor is positionable at a lowered position. The load floor latch assembly further includes a latch rotatable about a pivot axis to a closed configuration for securing the load floor at the lowered position. The latch includes a lower support arm and an upper clamp arm. In the closed configuration the lower support arm supports the lower surface of the load floor and at least a portion of the weight of the load floor is exerted on the lower support arm and applies a torque on the latch to impart a downward force from the upper clamp arm.

20 Claims, 5 Drawing Sheets

LOAD FLOOR LATCHES AND LATCH ASSEMBLIES, AND VEHICLES HAVING THE SAME

INTRODUCTION

The technical field generally relates to storage compartments in vehicles, and more particularly relates to load floor latch assemblies for selectively securing and accessing compartments in vehicles.

In view of increasing social awareness of the impact of automobiles on the environment, there is a demand to minimize the overall mass of vehicle while still meeting the feature requirements of the consumer. By reducing the mass of the interior components of the vehicle, several goals can be achieved. Among these goals is the overall weight of the vehicle, which can be minimized to thereby reduce the power and fuel required to operate the vehicle. The reduction of the size of the interior components of vehicles has led to a need for more efficient use of interior space. Various types of storage containers for the interior of the vehicle have been proposed to handle this ever increasing need.

Rear cargo spaces and/or trunks of modern automobiles are usually provided with removable load floor panels. These panels ordinarily support the weight of objects placed in the rear cargo spaces or trunks and are removable to allow access to a spare tire, for example, which is commonly stored in a compartment under the load floor panel. It is common for the load floor panel to be held in place by gravity and a floor mat that usually covers the load floor panel. The load floor panels are usually equipped with handles that are flush with the top surface of the load floor panel in order to allow a user to remove the panel when necessary. However, this commonly used arrangement has a draw back in that the load floor panel may become dislodged when travelling over rough roads. Further, because the panel is not positively secured in place, it may become loose and rattle around in the trunk resulting in undesirable noises. Further, for sport utility vehicles (SUVs) and wagon type vehicles, the load floor may be within the same cabin as occupants. Thus, safety requires that the load floor be held in position in case of a panic brake or crash condition. The need persists in the art for a latch to positively secure such load floor panels in place.

Accordingly, it is desirable to provide load floor latch assemblies for securing load floors in position. Also, it is desirable to provide load floor latch assemblies that facilitate access to the storage compartment covered by the load floor. In addition, it is desirable to provide latches for securing load floors in a lowered position and for supporting load floors in an elevated position. Furthermore, other desirable features and characteristics will become apparent from the subsequent detailed description and the appended claims, taken in conjunction with the accompanying drawings and this background.

SUMMARY

A load floor latch assembly is provided for selectively securing and accessing a compartment in a vehicle. An exemplary load floor latch assembly includes a load floor having an upper surface and a lower surface. The load floor is positionable at a lowered position. The load floor latch assembly further includes a latch including a lower support arm and an upper clamp arm. The latch is rotatable about a pivot axis to a closed configuration for securing the load floor at the lowered position. In the closed configuration the lower support arm supports the lower surface of the load floor and at least a portion of the weight of the load floor is exerted on the lower support arm and applies a torque on the latch to impart a downward force from the upper clamp arm.

An exemplary vehicle is provided and includes a storage compartment and a latch pivotably connected to the vehicle adjacent the storage compartment. The vehicle further includes a load floor. The load floor is positionable at a lowered position for covering the storage compartment. Further, the load floor is positionable at an elevated position for accessing the storage compartment. The latch has a closed configuration in which the latch secures the load floor in the lowered position. Also, the latch has an opened configuration in which the latch supports the load floor in the elevated position.

An exemplary latch is provided and includes a lower support arm having a distal end and a proximal end. The latch further includes an upper clamp arm having a distal end and a proximal end. An opening is defined between the lower support arm and the upper clamp arm to receive an object to be secured. The latch also includes a body interconnecting the proximal end of the lower support arm and the proximal end of the upper clamp arm. Further, the latch includes a pivot member located on the lower support arm and about which the latch rotates between a closed configuration and an opened configuration.

BRIEF DESCRIPTION OF THE DRAWINGS

The present subject matter will hereinafter be described in conjunction with the following drawing figures, wherein like numerals denote like elements, and wherein.

DETAILED DESCRIPTION

The following detailed description is merely exemplary in nature and is not intended to limit the subject matter claimed herein. Furthermore, there is no intention to be bound by any theory presented in the preceding background or the following detailed description.

Figure 1:
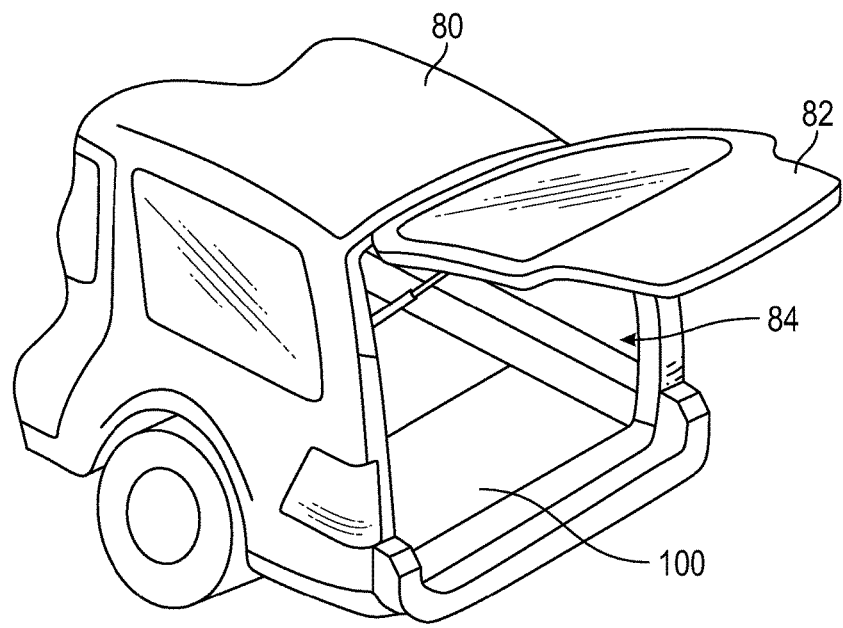
FIG. 1 is a perspective view of a portion of an exemplary vehicle including a load floor covering a storage compartment in accordance with an embodiment herein.

FIG. 1 is a perspective view of a vehicle 80. The vehicle 80 has a rear door or gate 82 that is opened to reveal a load compartment 84. The load compartment 84 is provided with a storage compartment or cavity 90 (shown in FIG. 2) such as for holding a spare tire, tools, or the like. As shown in FIG. 1, the vehicle 80 is provided with a detachable load floor 100. The load floor 100 lies over the cavity 90 in a lowered position, thereby covering the cavity 90.

Figure 2:
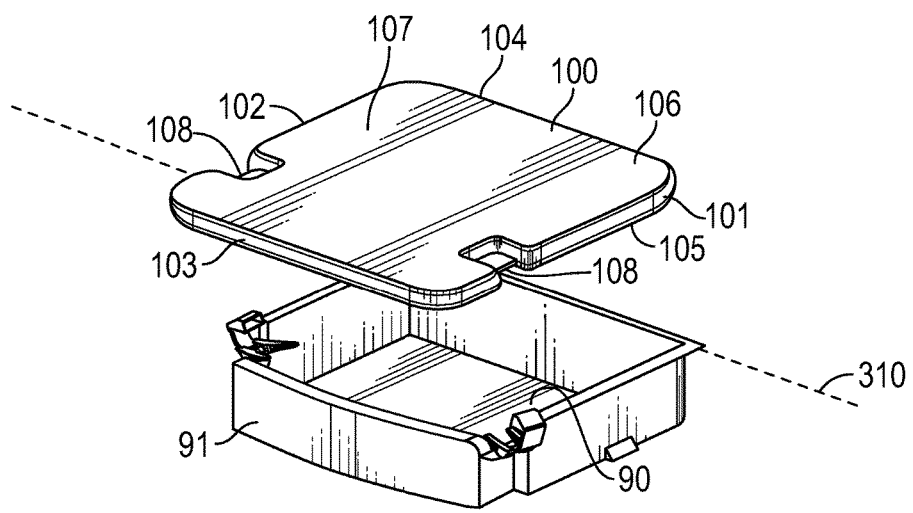
FIG. 2 is an exploded perspective view of the load floor of FIG. 1 shown in an elevated position over a storage compartment in accordance with an embodiment herein.
Figure 3:
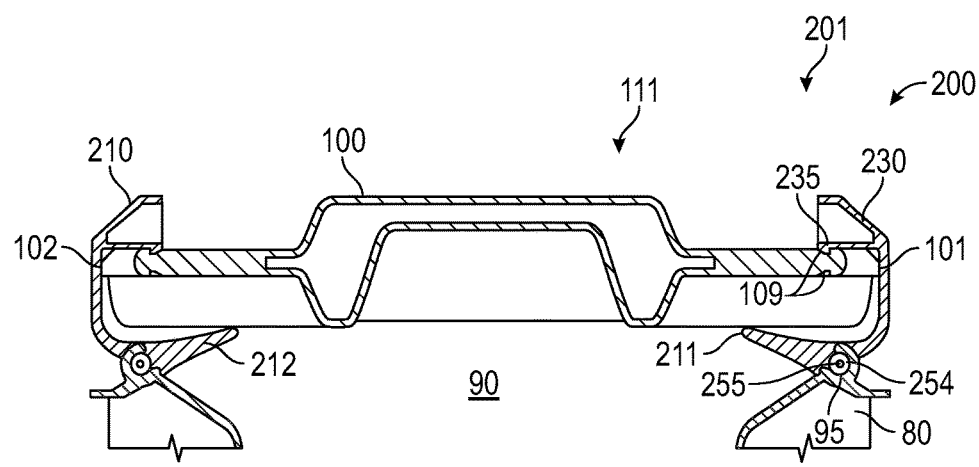
FIG. 3 is a schematic view of an end of a load floor in a lowered position and of the sides of two latches in the closed configuration securing the load floor in accordance with an embodiment herein.

FIG. 2 is an exploded perspective view of the load floor 100 overlying the cavity 90 formed in the vehicle 80 of FIG. 1. In FIG. 2, an interior structure 91, such as a collar or wall, of the vehicle 80 bounds and defines the cavity 90. As shown, the load floor 100 includes a first side 101 and a second side 102. Also, the load floor includes a trailing end 103 and a leading end 104. Further, the load floor 100 includes a lower surface 105 and an upper surface 106. As shown, the exemplary upper surface 106 is formed with a central region 107 and with recessed portions 108 lower than the central region 107, i.e., portions where the thickness of the load floor 100 is reduced. In the illustrated embodiment, the central region 107 is planar; however, the central region 107 may be molded with various forms, such as for use in storage, support, traction, or the like. Each recessed portion 108 may be formed with a notch 109 (as shown in FIG. 3 and described below). In exemplary embodiments, the load floor 100 is reversible such that the lower surface 105 or the upper surface 106 may be placed facedown over the cavity 90. For such embodiments, each surface 105 and 106 is provided with recessed portions 108 and notches 109 for engagement with the latches described herein, but may have differently formed central regions 107.

FIG. 3 is a cross sectional view of an exemplary load floor 100, overlying the cavity 90 formed in the vehicle 80. In FIG. 3, the load floor 100 is shown in a lowered position 111. The load floor is moveable between the lowered position 111 and an elevated position 112 (as shown in FIG. 8).

Figure 8:
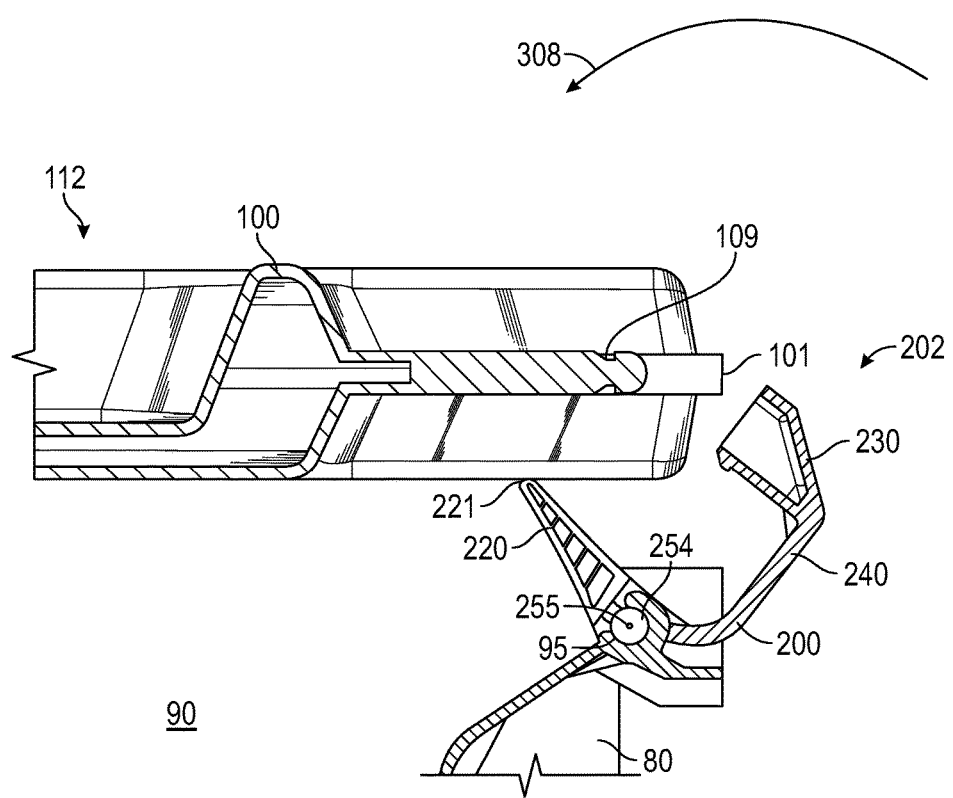
FIG. 8 is a schematic view of a portion of an end of a load floor in an elevated position and of the side of a latch in the opened configuration supporting the load floor in accordance with an embodiment herein.

In FIG. 3, a latch assembly 200 is pivotably mounted to the vehicle 80 adjacent the cavity 90 and is moveable between the closed configuration 201 and an opened configuration 202 (shown in FIG. 8). In the closed configuration 201 of FIG. 3, the exemplary latch assembly 200 supports, engages and secures the load floor 100 in the lowered position 111. Further, when moved from the closed configuration 201 to the opened configuration 202, the latch assembly 200 is configured to raise the load floor 100 to the elevated position 112 (shown in FIG. 8).

The exemplary latch assembly 200 includes at least one latch 210. In FIG. 3, the latch assembly 200 includes a first latch 211 at the first side 101 of the load floor 100 and a second latch 212 at the second side 102 of the load floor 100. The latches 211 and 212 are structurally identical and, when appropriate, each is referred to herein as latch 210 for simplicity of description.

Figure 4:
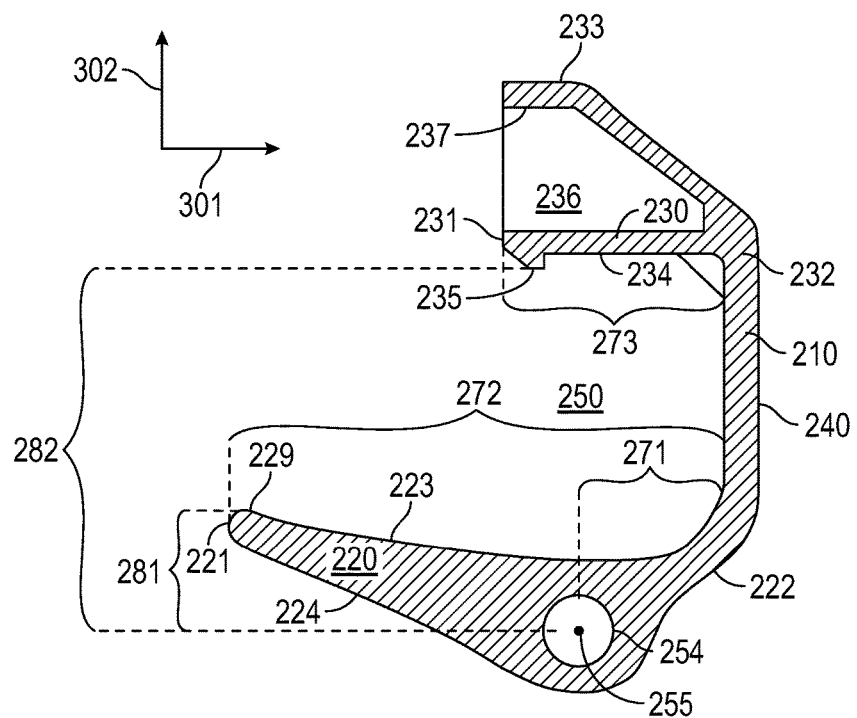
FIG. 4 is as side schematic view of an exemplary latch of FIG. 3 in accordance with an embodiment herein.

FIG. 4 illustrates more clearly the structure of each latch 210. An exemplary latch 210 includes a lower support arm 220, an upper clamp arm 230, and a body 240 interconnecting the lower support arm 220 and the upper clamp arm 230. In FIG. 4, the lower support arm 220 has a distal end 221 and a proximal end 222. Further, the lower support arm 220 includes an upper surface 223 and a lower surface 224. The upper clamp arm 230 has a distal end 231 and a proximal end 232. Further, the upper clamp arm 230 includes an upper surface 233 and a lower surface 234. Also, the upper clamp arm 230 includes a projection 235 that extends downward from the lower surface 234. As further shown, the upper clamp arm 230 may be formed with a hollow 236 to form a graspable grip 237 for a user to disengage the upper clamp arm 230 from the load floor 100. As shown, the body 240 is connected to the lower support arm 220 at the proximal end 222 and is connected to the upper clamp arm 230 at the proximal end 232.

An opening 250 is defined between the lower support arm 220 and the upper clamp arm 230 to receive an object, such as the load floor 100 when the load floor is in the lowered position 111 and the latch 210 is in the closed configuration 201 as shown in FIG. 3. In FIG. 3, the projection 235 of the upper clamp arm 230 is received within the notch 109 of the load floor 100 and engages the load floor 100 to prevent movement of the load floor 100. As result, the load floor 100 is secured at the lowered position 111 by the latch assembly 200.

As further shown in FIGS. 3 and 4, the latch 210 is formed with a pivot member 254, such as a rod, for engagement with the vehicle 80. Pivot member 254 provides for rotation of the latch 210 about a pivot axis 255 perpendicular to the plane of the drawing sheet. As shown, the pivot member 254 may be cylindrical and be fitted into a corresponding groove 95 formed in the vehicle 80. In the exemplary latch 210, the pivot member 254 is formed in the lower support arm 220 between the distal end 221 and the proximal end 222.

In FIG. 4, an arbitrary coordinate system is designated with an x-axis 301 in the x- or horizontal direction and a y-axis 302 in the y- or vertical direction. As shown, the pivot axis 255 is located at a first distance 271 in the x-direction from the body 240. Further, the distal end 221 of the lower support arm 220 is located at a second distance 272 in the x-direction from the body 240. The second distance 272 is greater than the first distance 271. As further shown, the distal end 231 of the upper clamp arm 230 is located at a third distance 273 in the x-direction from the body 240. In the embodiment of FIG. 4, the third distance 273 is greater than the first distance 271 and less than the second distance 272.

As further shown in FIG. 4, the uppermost portion 229 of the upper surface 223 near the distal end 221 of the lower support arm 220 is located at a first height 281 in the y-direction from the pivot axis 255. The first height 281 is greater than zero. The lower surface 234 of the distal end 231 of the upper clamp arm 230 is located at a second height 282 in the y-direction from the pivot axis 255. The second height 282 is greater than the first height 281.

Figure 5:
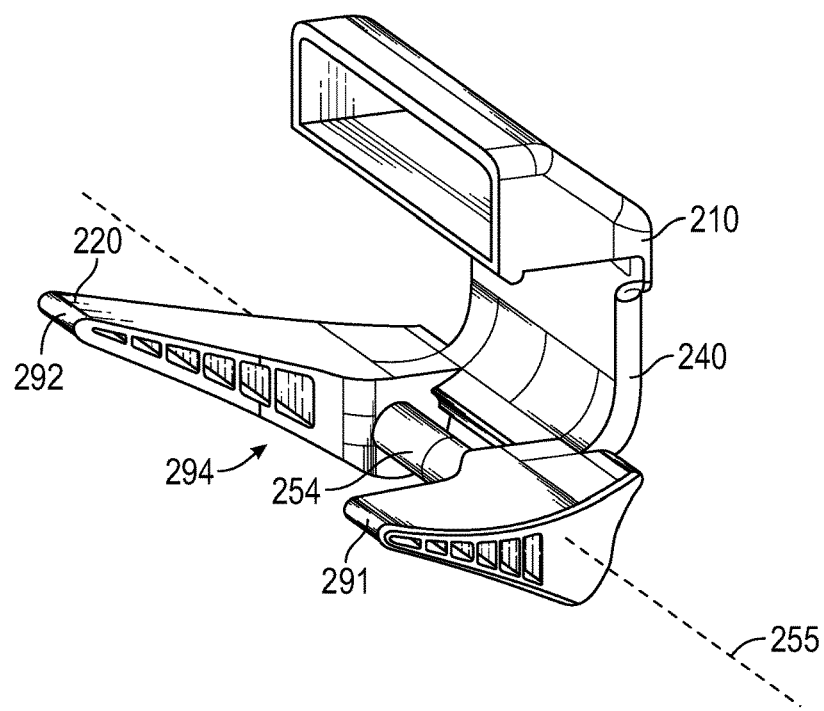
FIG. 5 is a perspective view of an exemplary latch of FIG. 3 in accordance with an embodiment herein.
Figure 6:
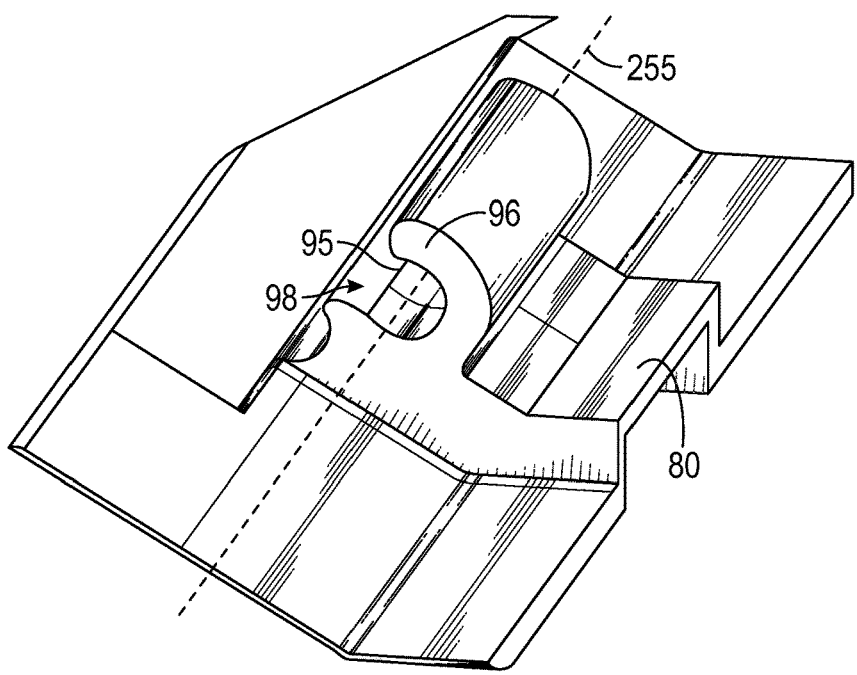
FIG. 6 is a perspective view of an exemplary vehicle structure for pivotable connection with the latch of FIG. 5 in accordance with an embodiment herein.

FIG. 5 provides a perspective view of the exemplary latch 210 while FIG. 6 provides a perspective view of the portion of the vehicle 80 that engages latch 210. In FIG. 5, the lower support arm 220 of the latch 210 is formed with a first branch 291 and a second branch 292 separated by a gap 294. The pivot member 254 extends along the pivot axis 255 from the first branch 291 across the gap 294 to the second branch 292. Further, the body 240 of the latch 210 is connected to each branch 291 and 292 and also extends across the gap 294.

In FIG. 6, the structure of the vehicle 80 that engages the latch 210 is more clearly illustrated. As shown, the vehicle 80 forms a groove 95 extending in the direction of the pivot axis 255. Specifically, the vehicle 80 includes a curved cylindrical projection 96 that bounds the groove 95. Further, the vehicle 80 is formed with an opening 98 through which the pivot member 254 may pass when inserted into the groove 95. The opening 98 may be formed with a width slightly smaller than the diameter of the pivot member 254, to allow for snap fit engagement.

Figure 7:
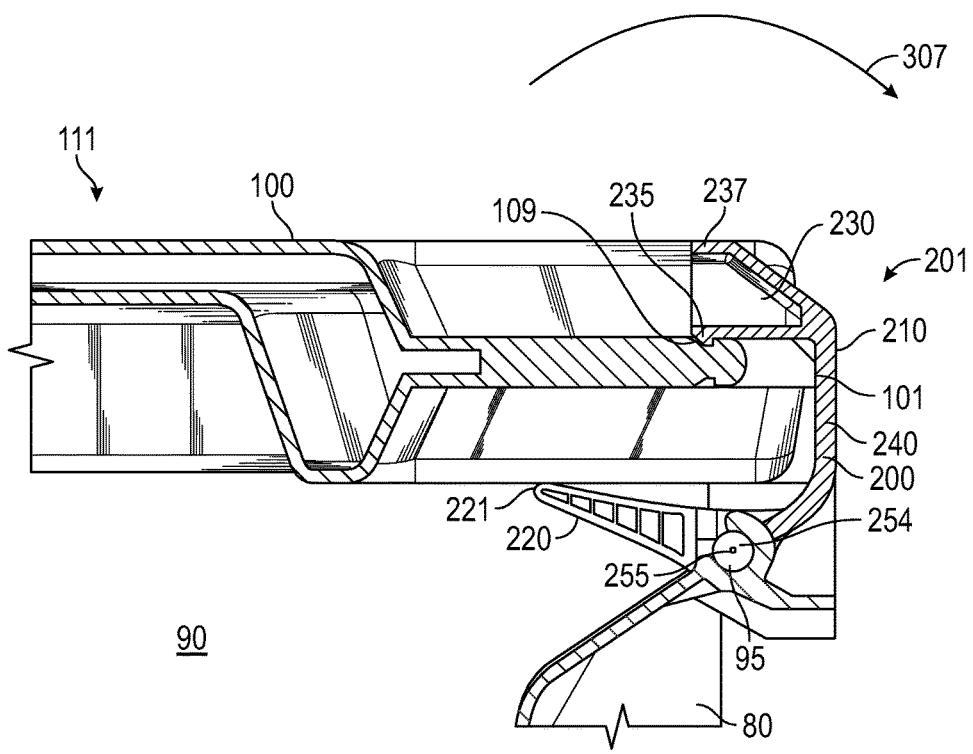
FIG. 7 is a schematic view of a portion of an end of a load floor in a lowered position and of the side of a latch in the closed configuration securing the load floor in accordance with an embodiment herein.

FIGS. 7 and 8 illustrate the movement of the latch 210 between the closed configuration 201 and the opened configuration 202, and the movement of the load floor 100 between the lowered position 111 and the elevated position 112. As shown, the latch 210 is rotated about the pivot axis 255 in the direction of arrow 307 from the closed configuration 201 to the opened configuration 202, and is rotated about the pivot axis 255 in the direction of arrow 308 from the opened configuration 202 to the closed configuration 201.

In FIG. 7, the latch 210 secures the load floor 100 at the lowered position 111 in which the load floor covers the storage compartment or cavity 90 of the vehicle 80. In the closed configuration 201, the latch 210 automatically locks the load floor 100 in the lowered position 111 through engagement between the notch 109 and the projection 235. As a result, the latch 210 holds the load floor 100 at the lowered position despite a vertical upward force on the load floor 100 due to a panic braking situation or a vehicle crash. To unlock or disengage the latch 210 and the load floor 100, a force in the direction of arrow 307 may be applied to the latch 210 by a user grasping and pulling the grip 237 of the upper clamp arm 230. The upward component of such force removes the projection 235 from the notch 109 formed in the load floor 100. Further, the force results in the rotational movement of the latch 210 about the pivot axis 255 in the direction of arrow 307.

As a result, the distal end 221 of the lower support arm 220 is moved upward from a lowest position in FIG. 7 to a raised position in FIG. 8. The lower support arm 220 raises the load floor 100 from the lowered position 111 of FIG. 7 to the elevated position 112 of FIG. 8 for accessing the cavity 90, i.e., for providing a user with access to the cavity 90.

In the elevated position 112 of the load floor 100 in FIG. 8, access is provided to the storage compartment or cavity 90 underlying the load floor 100. The latch 210 may hold the opened configuration 202 shown in FIG. 8 and support the load floor 100 at the elevated position 112 despite the weight of the load floor 100 and typical objects stored on the load floor 100, due to friction between the pivot member 254 and the groove 95. In other words, when the latch 210 is in the opened configuration 202 and the lower support arm 220 holds the load floor 100 in the elevated position 112 over the storage compartment 90, the load floor 100 rests on the lower support arm 220 and the downward force on the lower support arm 220 resulting from the weight of the load floor 100 and objects thereon does not apply a sufficient torque on the latch 210 to pivot the latch 210 in the direction of arrow 308 to the closed configuration 201. A user may apply a force, such as downward force onto the load floor 100 or in the direction of arrow 308 onto the body 240 or upper clamp arm 230, to overcome the friction and move the latch 210 about the pivot axis 255 to return the latch 210 to the closed configuration 201. Such movement allows the load floor 100 to return to the lowered position 111.

When the load floor 100 is lowered and the latch assembly 200 is closed, such as in FIG. 7, at least a portion of the weight of the load floor 100 is exerted on the lower support arm 220 and applies a torque on the latch 210 about the pivot axis 255 to impart a downward force from the upper clamp arm 230 onto the upper surface 106 of the load floor 100. Therefore, upward jostling of the vehicle may not result in dislodging the load floor 100 from the vehicle 80. Also, when the load floor 100 is lowered and the latch assembly 200 is closed, such as in FIG. 7, the body 240 contacts the side 101 of the load floor 100. As a result, side to side movement of the load floor 100 may be inhibited.

As shown in FIG. 7, when in the lowered position 111, the load floor 100 is located between the lower support arm 220 and the upper clamp arm 230. As shown in FIG. 8, when in the elevated position 112, the load floor 100 is located over the lower support arm 220.

Cross-referencing FIG. 2 with FIGS. 7-8, it is noted that that leading end 104 of the load floor 100 may be pivotably mounted to the vehicle 80, such as to the interior structure 91 about an axis 310. It may be seen that the latch pivot axes 255 are perpendicular to the load floor pivot axis 310. In such an embodiment, the load floor 100 pivots open such that the trailing end 103 of the load floor 100 is raised from the cavity 90 and the leading end 104 of the load floor 100 pivots about the axis 310 when the latches 210 are opened. Alternatively, the entire load floor 100, including both ends 103 and 104, may be raised by the latches 210 when opened.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration as claimed in any way. Rather, the foregoing detailed description will provide those skilled in the art with a convenient road map for implementing an exemplary aspect. It being understood that various changes may be made in the function and arrangement of elements described in an exemplary aspect without departing from the scope herein as set forth in the appended claims.

What is claimed is:

1. A load floor latch assembly comprising:
   a load floor having an upper surface and a lower surface, wherein the load floor is positionable at a lowered position; and
   a latch including a lower support arm and an upper clamp arm and rotatable about a pivot axis to a closed configuration for securing the load floor at the lowered position, wherein in the closed configuration the lower support arm supports the lower surface of the load floor and at least a portion of the weight of the load floor is exerted on the lower support arm and applies a torque on the latch to impart a downward force from the upper clamp arm.

2. The load floor latch assembly of claim 1 wherein the load floor is positionable at an elevated position, wherein the latch is rotatable about the pivot axis from the closed configuration to an opened configuration in which the latch supports the load floor at the elevated position, and wherein the when rotating the latch to the opened configuration the latch raises the load floor from the lowered position to the elevated position.

3. The load floor latch assembly of claim 1 wherein the load floor is formed with a notch in the upper surface and wherein the latch includes a projection on the upper clamp arm that engages with the notch when the load floor is at the lowered position and the latch is in the closed configuration.

4. The load floor latch assembly of claim 1 wherein:
   the lower support arm has a distal end and a proximal end;
   the upper clamp arm has a distal end and a proximal end, wherein an opening is defined between the lower support arm and the upper clamp arm to receive the load floor when the load floor is at the lowered position and the latch is in the closed configuration; and
   the latch further includes a body interconnecting the proximal end of the lower support arm and the proximal end of the upper clamp arm.

5. The load floor latch assembly of claim 4 wherein:
   the pivot axis is located at a first distance in an x-direction from the body;

the distal end of the lower support arm is located at a second distance in the x-direction from the body, wherein the second distance is greater than the first distance;

the distal end of the upper clamp arm is located at a third distance in the x-direction from the body, wherein the third distance is greater than the first distance and less than the second distance;

the distal end of the lower support arm is located at a first height in a y-direction from the pivot axis, wherein the first height is greater than zero; and the distal end of the upper clamp arm is located at a second height in the y-direction from the pivot axis, wherein the second height is greater than the first height.

6. The load floor latch assembly of claim 1 wherein the lower support arm includes a first branch and a second branch separated by a gap, and wherein the latch includes a pivot member extending from the first branch across the gap to the second branch.

7. The load floor latch assembly of claim 1 wherein the load floor has a first side and a second side, wherein the latch is a first latch at the first side of the load floor and wherein the load floor latch assembly further comprises a second latch at the second side of the load floor.

8. The load floor latch assembly of claim 7 wherein each latch includes a body interconnecting the lower support arm and the upper clamp arm, and wherein when each latch is in the closed configuration, the body of the first latch contacts the first side of the load floor, and the body of the second latch contacts the second side of the load floor.

9. A vehicle comprising:
a storage compartment;
a latch pivotably connected to the vehicle adjacent the storage compartment; and
a load floor, wherein the load floor is positionable at a lowered position for covering the storage compartment, and wherein the load floor is positionable at an elevated position for accessing the storage compartment;
wherein the latch has a closed configuration in which the latch secures the load floor in the lowered position, and
wherein the latch has an opened configuration in which the latch supports the load floor in the elevated position.

10. The vehicle of claim 9 wherein:
the latch includes a lower support arm and an upper clamp arm;
when the latch is in the closed configuration, the upper clamp arm secures the load floor in the lowered position, and
when the latch is in the opened configuration, the lower support arm supports the load floor in the elevated position.

11. The vehicle of claim 10 wherein, when in the lowered position, the load floor is located between the lower support arm and the upper clamp arm and wherein when in the elevated position, the load floor is located over the lower support arm.

12. The vehicle of claim 10 wherein, when the latch is in the opened configuration and the lower support arm holds the load floor in the elevated position over the storage compartment, the load floor rests on the lower support arm and the weight of the load floor on the lower support arm does not apply a torque on the latch sufficient to pivot the latch to the closed configuration.

13. The vehicle of claim 10 wherein, when the latch is in the closed configuration and the upper clamp arm secures the load floor in the lowered position over the storage compartment, at least a portion of the weight of the load floor is exerted on the lower support arm and applies a torque on the latch to impart a downward force on the load floor by the upper clamp arm.

14. The vehicle of claim 10 wherein, when pivoting the latch from the closed configuration to the opened configuration, the lower support arm raises the load floor from the lowered position to the elevated position.

15. The vehicle of claim 10 wherein the latch includes a body connected to the lower support arm and the upper clamp arm, wherein when the latch is in the closed configuration, the body contacts a side of the load floor.

16. The vehicle of claim 9 wherein the load floor has a first side and a second side, wherein the latch is a first latch at the first side of the load floor, and wherein the vehicle comprises a second latch at the second side of the load floor.

17. The vehicle of claim 9 wherein a groove is formed in the vehicle adjacent the storage compartment and wherein the latch includes a rod member that is pivotably received in the groove.

18. A latch comprising:
a lower support arm having a distal end and a proximal end;
an upper clamp arm having a distal end and a proximal end, wherein an opening is defined between the lower support arm and the upper clamp arm to receive an object to be secured;
a body interconnecting the proximal end of the lower support arm and the proximal end of the upper clamp arm; and
a pivot member located on the lower support arm and about which the latch rotates between a closed configuration and an opened configuration.

19. The latch of claim 18 wherein:
the pivot member is located at a first distance in an x-direction from the body;
the distal end of the lower support arm is located at a second distance in the x-direction from the body, wherein the second distance is greater than the first distance;
the distal end of the upper clamp arm is located at a third distance in the x-direction from the body, wherein the third distance is greater than the first distance;
the distal end of the lower support arm is located at a first height in a y-direction from the pivot member, wherein the first height is greater than zero; and
the distal end of the upper clamp arm is located at a second height in the y-direction from the pivot member, wherein the second height is greater than the first height.

20. The latch of claim 18 wherein the lower support arm includes a first branch and a second branch separated by a gap, and wherein the pivot member extends from the first branch across the gap to the second branch.

* * * * *